Figure 1:
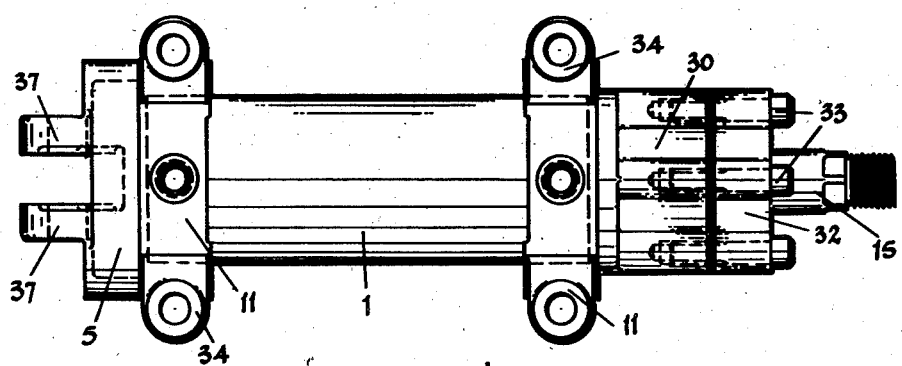

Jan. 21, 1947.  B. H. URSCHEL ET AL  2,414,492

FLUID PRESSURE ACTUATING DEVICE

Filed Oct. 12, 1944  3 Sheets-Sheet 1

INVENTORS
Bertis H. Urschel
and Lorin H. Janger
BY

Jan. 21, 1947.   B. H. URSCHEL ET AL   2,414,492
FLUID PRESSURE ACTUATING DEVICE
Filed Oct. 12, 1944   3 Sheets-Sheet 2

INVENTORS
Bertis H. Urschel
and Lorin H. Janzer
BY

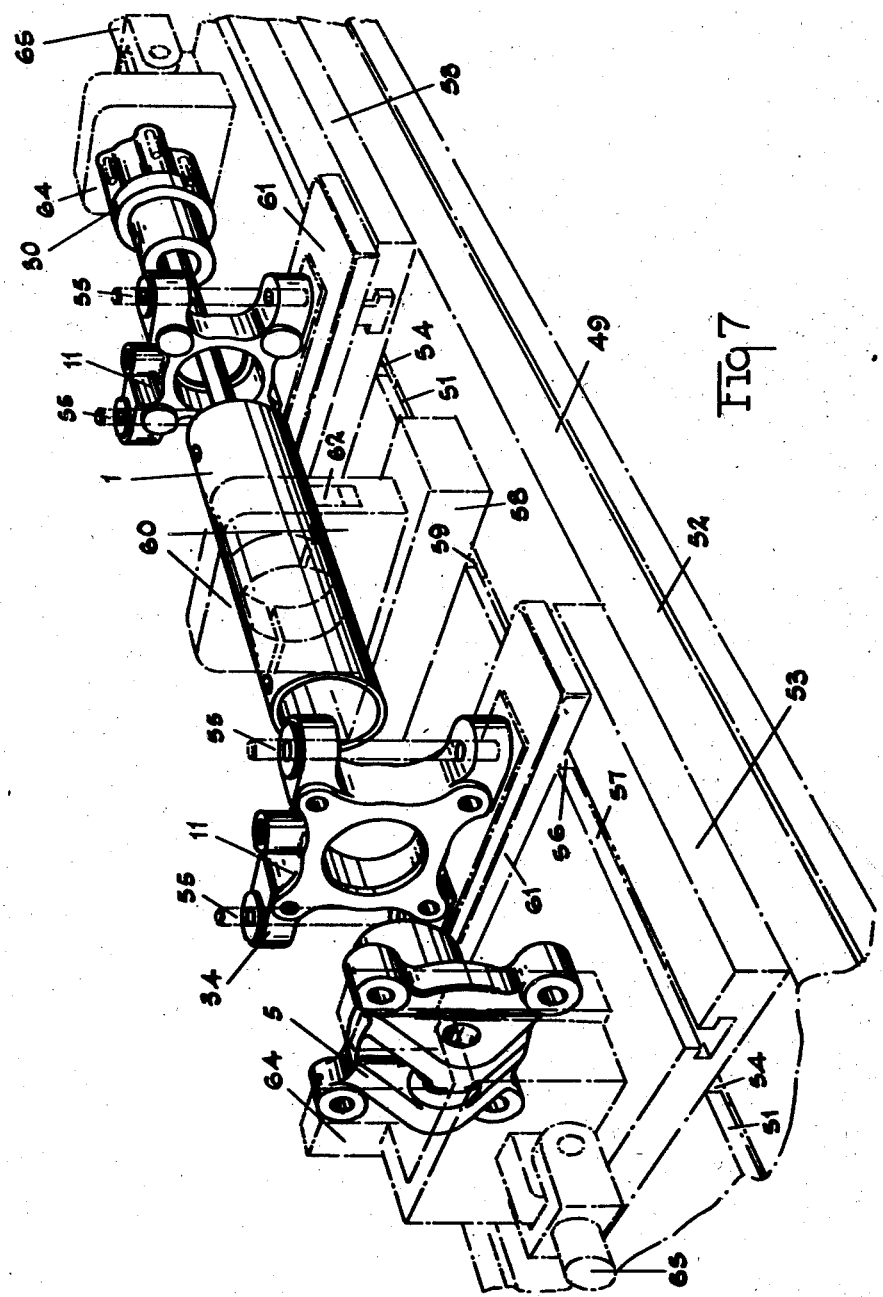

Patented Jan. 21, 1947

2,414,492

UNITED STATES PATENT OFFICE 2,414,492

FLUID PRESSURE ACTUATING DEVICE

Bertis H. Urschel and Lorin H. Janzer, Bowling Green, Ohio, assignors to The Urschel Engineering Company, Bowling Green, Ohio, a corporation of Ohio Application October 12, 1944, Serial No. 558,442

3 Claims. (Cl. 309—2)

Our invention has for its object to provide an efficient high fluid pressure actuating device that may be axially readily assembled and variably mounted, and therefore usable for a great variety of purposes.

The invention provides means whereby the parts of a cylinder are formed to withstand exceedingly high liquid pressure and yet are so formed and treated that they may be accurately fitted to each other to produce a durable and efficient high fluid pressure actuating device that may be made at a low cost.

The invention comprises the construction of a fluid pressure actuating device having thin-walled metal cylinders, one or both ends of which are closed and frictionally sealed, interiorly and exteriorly, by simultaneous counter thermic action of shrinking and expansion to normal atmospheric temperatures of a pair of relatively thick metal cylindrical engaging parts. The construction may be assembled by subjecting one of said parts to a marked low temperature relative to atmospheric temperatures and thereby contracting the same and subjecting the second part to a marked high temperature relative to atmospheric temperatures and thereby expanding the same to enable the said parts to be first readily and relatively moved, the said one part to within the interior of an end of the cylinder and the said second part to about the exterior of the said end of the cylinder, and in counteracting relation in their subsequent simultaneous heat expansion and contraction. The relatively large wall thickness of the parts causes the said one part to exert a great expansive force and the said second part to exert a great contractive force as they simultaneously change to normal atmospheric temperature sealing the end of the cylinder. Thus, each part sustains the thin wall cylinder end against deformation by the other and by their high counteracting thermic pressures on the surface of the end of the cylinder produces high frictional engagement with the end of the cylinder to enable the cylinder structure to withstand exceedingly high liquid pressures, to which, in use, it may be subjected.

The invention disclosed in the drawings and this specification embraces different forms of constructions having the equivalent parts or elements.

Figure 2:
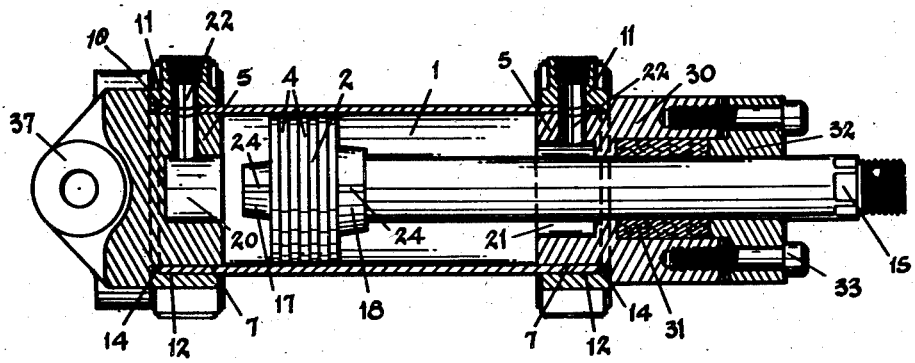
Figure 3:
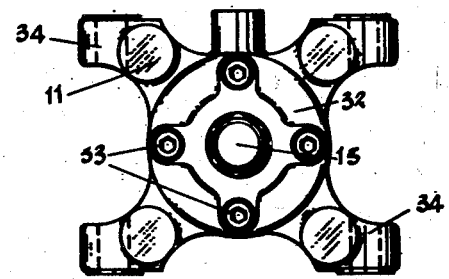
Figure 4:
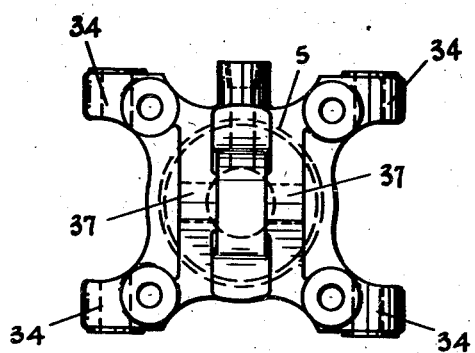
Figure 5:
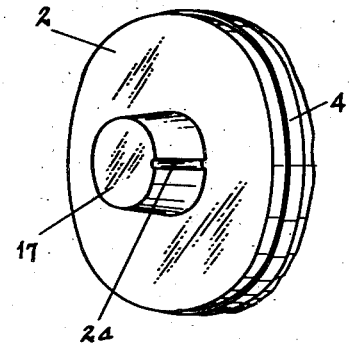
Figure 6:
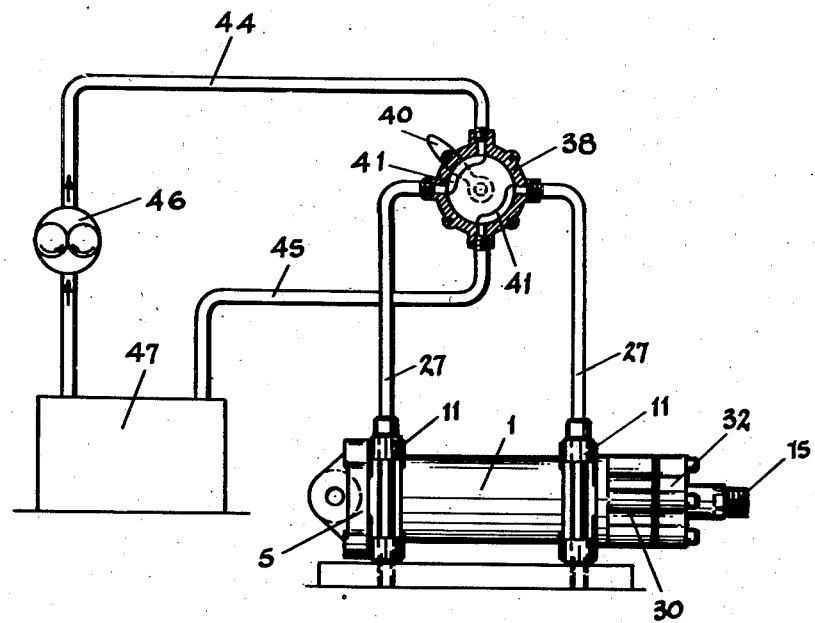

Fig. 1 illustrates a perspective view of the assembled cylinder and its parts. Fig. 2 illustrates a longitudinal sectional view of the cylinder. Fig. 3 illustrates one end view of the cylinder and its piston rod. Fig. 4 illustrates the other end view of the cylinder. Fig. 5 illustrates a broken perspective view of the piston and illustrates a cone shaped boss having a fluid escape channel. Fig. 6 illustrates a diagram of an apparatus in which the cylinder may be used. Fig. 7 illustrates the parts of the cylinder prior to its assembly and indicates a machine or jig by which the heat treated parts may be simultaneously and readily disposed in their proper relation on the opposite end parts of the cylinder, preparatory to their temperature changes to atmospheric temperatures.

The high pressure actuating device is provided with a cylinder 1 having a relatively thin wall shell with an interiorly smoothly reamed surface to coact with the piston. The piston 2 is provided with piston rings 4. If desired the fluid pressure may be well above three thousand pounds per square inch in the ordinary use of the pressure device. The cylinder 1 has a pair of thick cylinder heads 5 having outer cylindrical surfaces 7 quite exactly finished to diameters slightly greater than the interior surfaces of the end parts 10 of the cylinder and a pair of rings 11 having inner surfaces 12 finished accurately to an inner diameter slightly less than the exterior diameter of the end parts of the cylinder. The rings have inwardly extending flanges 14 that engage the end surfaces of the cylinder preferably without contact with the cylindrical surfaces of the heads.

Prior to assembly of the pressure device, the heads are subjected to chilling temperatures substantially from —20° to —30° F. for sufficient period of time to produce heat saturation at the selected low temperature range and the rings are subjected to a temperature of substantially from 900° to 1100° F. for sufficient time to produce heat saturation at the high temperature. When the heads are reduced to the low temperature range the heads have a size that enables them to be readily slid onto the end parts 10 of the cylinder and when the rings are heated to the high temperature range, they will have a diameter that enables them to be readily slid onto the exterior of the said cylinder end parts until the edges of the cylinder end parts are engaged by the flanges 14. The heads and the rings are placed and moved to their respective positions substantially simultaneously on the end parts 10 of the cylinder. If desired, the heads and rings may be placed substantially simultaneously on both ends of the cylinder in one operation, or a head and a ring may be slid on one end of the cylinder and then a head and a ring may be slid on the other end of the cylinder.

The piston 2 is press fitted to a piston rod 15. From the opposite sides of the piston may protrude conical bosses 17 and 18. One of the protruding bosses, boss 17, may be formed by a conical end part of the piston rod and the other boss 18 may be conically formed on a side part of the piston. The cylinder heads 5 are provided with cylindrical recesses or sockets 20 and 21 having diameters substantially fitting the bases of the conical bosses.

The heads 5, the rings 11 and the end parts 10 of the cylinder have registering openings 22 through which the fluid is directed through the sockets 20 to and from the interior of the cylinder to reciprocate the piston. When the fluid is directed to either side of the piston, the piston produces its power stroke until a conical boss enters a socket on the other side of the piston and begins to progressively restrict the outflow of the fluid. Narrow channels 24 are formed in the surfaces of the bosses and in the planes of the axes of the bosses. As the smaller end of each boss approaches to near the inner end of its associated socket, a thin layer of the fluid remains on and intermediate the piston and the cylinder head and is enabled to escape through the channel 24. Hammering is thus prevented as the piston reaches to near the cessation of its movement.

The interior of the cylinder is connected to a source of high fluid pressure through the pipes 27 that are connected to the cylinder. The fluid in the pipes is reversibly moved to alternately transmit and release the fluid pressure, first on one side of the piston and then on the other, to reciprocate the piston in the cylinder. The alternate high and low pressure may be produced by any well known means, such as, for example, by a reciprocatory manually operated valve, a slide valve rotatably or reciprocably moved by the pressure device or by any other means to produce an alternate periodic high fluid pressure in one pipe and a low or exhausting pressure in the other pipe.

One of the heads 5 is formed to have an oil gland formed of a cylindrical shell 30 through which the piston rod 15 extends. An oil retaining material 31 is packed into the shell about the piston rod to lubricate the rod. The shell may be closed by a cap 32 secured to the outer end of the shell by machine screws 33. In order to tightly secure the cylinder in position, machine screws may be located in holes formed in corner ears 34 of the rings to secure the cylinder to an oscillatory supporting plate or to a fixed plate or base part to dispose the major axes of the cylinder and piston at right angles or parallel to the base.

If desired a head 5 may be provided with projecting bearing ears 37 having bearing surfaces for pivotally supporting the cylinder on a suitable fixed base and enable oscillation of the cylinder, such as where the cylinder and its piston produce rotation of a crank and parts connected to the crank.

As shown in Fig. 6 the cylinder is fixedly secured to a fixed base and connected to a source of oil pressure supply by the non-jointed pipes 27. Where the cylinder is pivotally supported, the cylinder may be connected to the source of oil pressure supply by pipes having swingable jointed parts wherein the joints are located in the axis of movement of the pivoted base or the bearing ears 37. The pipes 27 are connected to a two-way hand valve 38. The rotatable member has a handle 40 located exterior to the valve for rotating the movable valve member 39 of the valve and a pair of arcuate channels 41 formed therein to register with any pair of four openings formed in the valve shell. Thus, one of the pipes 27 may be connected to the pipe 44 and the other to pipe 45. Alternately the pipes 27 may be connected with diametrically oppositely disposed openings leading one to the power pump 46 and the other to a point of fluid discharge. The pipe 44 connects the valve with the power pump 46 and the pipe 45 with an oil vat 47 or reservoir from which oil is drawn by the pump. The pipe 45 returns oil to the vat 47 from the cylinder as the piston is moved by the pressed oil. At the ends of the strokes of the piston, the connections of the pipes 27 are reversed by the valve to reciprocate the piston.

The parts of the cylinder are assembled by moving them axially toward each other by any form of power means, such as a pair of fluid pressure cylinders or a foot pedal that actuates power transmitting rods that are connected to the end blocks secured to slidable plates. All of the essential elements of the high pressure actuating device when the parts are put together must of necessity align with each other axially, and, except for the piston, must also align angularly with respect to the axis of the cylinder and piston.

In Fig. 7 is shown an assembly jig and the parts of the cylinder and piston. The jig 49 and its parts are shown in broken or phantom lines while the parts of the cylinder are shown in solid lines. The jig when operated simultaneously pushes the heat treated heads and the rings on the end parts of the cylinder. The parts of the cylinder are shown in positions on the movable parts of the jig for assembly of the parts of the cylinder. The piston and its piston rod are first placed in the cylinder. The parts of the cylinder are secured in rectilinear alignment by slidably recessed blocks and slidable plates and may be moved along the guideways of the jig relative to each other.

The jig 49 has guideways 51 formed in its bed plate 52 and movable end plates 53 having downwardly extending guide lugs 54 slidably fitting the guideways 51 in the bed plate. The ring supporting plates 61 have upright pins 55 and downwardly extending lugs 56 slidably fitting in guideways 57 in the movable end plates 53. The cylinder supporting plate 58 has guide lugs 59 fitting the guideways 51 in the bed plate.

The cylinder is centrally held in position, though not necessarily rigidly, by circularly recessed blocks 60 having telescoping lug and recesses 62 at the ends of the blocks. The heads 5 are supported in end recessed blocks 64 secured to end plates 53. The blocks 64 are formed, one to receive the piston rod lubricating gland or shell 30 and the other the bearing ears 37 and to support the heads 5.

The power is then applied and the rods 65 that are connected to the recessed blocks 64 are moved simultaneously until the heads enter the rings 11. The blocks 64 are secured in position to the slidable plates 53 and the rings and the heads then slide along the opposite end parts 10 of the cylinder 1. The cylinder and its assembled parts may then be removed from the jig and the rings and the heads allowed to return to atmospheric temperatures.

A head and a ring may be, if desired, placed in position and secured to the cylinder simultaneously on one end of each cylinder by the jig if desired, but to enable saving in the cost of production, both of the heads and the rings should be simultaneously placed on each cylinder.

We claim:

1. A cylinder, for a fluid pressure operated device, having an open end shell forming the cylinder body, the shell having an outer, continuous lateral cylindrical surface area, adjacent said open end, and an inner, continuous lateral cylindrical surface area, adjacent said open end and in concentric, nesting relation with said outer surface area; a cylinder head having a continuous lateral cylindrical surface area disposed within the open end of said shell to locate its said surface area in engagement with said inner surface area of said shell, the circumference of said head surface area being, at temperatures normal to cylinder use, greater than the circumference of said shell inner surface area; and a ring having an inner continuous lateral cylindrical surface area disposed about the open end of said shell to locate its said surface area in engagement with said outer surface area of said shell, the circumference of said ring surface area being, at temperatures normal to cylinder use, less than the circumference of said shell outer surface area, whereby the head and ring exert counter-thermic pressures radially with respect to the shell to sustain the shell and affix the cylinder head to the open end of the shell.

2. A cylinder, for a fluid pressure operated device, having an open-end cylindrical shell forming the cylinder body and means for closing said open end comprising a cylindrically shaped head, disposed within the open end of the cylindrical shell and in concentric relation therewith, the diameter of the head being greater than the internal diameter of said shell open end, and a ring disposed around the said end of the cylindrical shell and in concentric relation therewith and with said head, the ring having an inner diameter less than the outer diameter of the said end of the cylindrical shell whereby the end of said shell is pinched between the head and the ring and the head is locked in sealing relation to said shell.

3. A chamber member, for receiving and containing fluid under pressure, having a shell forming the body of the member; the shell having an opening, the portions of the shell surrounding said opening extending through a distance substantially parallel to a projection of said opening axis and having an outer surface of a predetermined contour characterized by having a plurality of contiguous points thereon spaced an equal and certain distance from said axis projection and disposed so that a straight line intersecting said points extends parallel to said axis projection, said opening surrounding portions of the shell also having an inner surface of a predetermined contour characterized by having a plurality of contiguous points thereon spaced an equal and certain distance from said axis projection and disposed so that a straight line intersecting said points extends parallel to said axis projection; a part disposed within said opening and having a surface of a predetermined contour, engaging said shell inner surface, and characterized by having a plurality of contiguous points thereon spaced a greater distance from said axis projection than said points on said inner shell surface and disposed so that a straight line intersecting said points extends parallel to said axis projection, and a second part having an opening into which said shell portions extend, portions of the part surrounding the part opening extending a distance substantially parallel to a projection of the axis of the part opening and forming an inner surface of a predetermined contour, engaging said shell portion outer surface, and characterized by having a plurality of contiguous points spaced a lesser distance from said shell opening axis projection than said points on said outer shell surface and disposed so that a straight line intersecting said points extends parallel to said shell opening axis projection.

BERTIS H. URSCHEL.
LORIN H. JANZER.